United States Patent [19]
Cserteg et al.

[11] Patent Number: 5,751,105
[45] Date of Patent: May 12, 1998

[54] ASSEMBLY ARRANGEMENT FOR A COMPACT FLUORESCENT LAMP

[75] Inventors: Istvanne Cserteg; Jozsef Tokes; Istvan Wursching; Jozsef Fulop, all of Budapest, Hungary

[73] Assignee: General Electric Company, Schenectady, N.Y.

[21] Appl. No.: 573,313

[22] Filed: Dec. 15, 1995

[51] Int. Cl.⁶ .................. H01J 1/62; H01J 63/04; H01J 5/48; H01J 5/50
[52] U.S. Cl. ............ 313/493; 313/318.01; 313/318.08; 313/318.12; 313/634
[58] Field of Search .................... 313/492, 493, 313/238, 247, 248, 249, 251, 252, 266, 287, 634, 318.01–318.12

[56] References Cited

U.S. PATENT DOCUMENTS

| | | | |
|---|---|---|---|
| 503,108 | 8/1893 | Bates | 313/318.08 |
| 2,074,154 | 3/1937 | Stechbart | 313/318.08 |
| 3,706,902 | 12/1972 | Cookson | 313/318.08 |
| 3,808,495 | 4/1974 | Win. | |
| 4,661,890 | 4/1987 | Watanabe et al. | |
| 4,695,767 | 9/1987 | Wittmann | 313/493 X |
| 4,703,227 | 10/1987 | Takeda et al. | 313/634 |
| 4,924,368 | 5/1990 | Northrop et al. | |
| 4,963,785 | 10/1990 | Takagi et al. | 313/318.08 |
| 4,990,821 | 2/1991 | Blaisdell et al. | |
| 5,001,387 | 3/1991 | van der Heijden. | |
| 5,086,249 | 2/1992 | Blaisdell et al. | 313/318 |
| 5,128,590 | 7/1992 | Holzer | 313/493 X |
| 5,285,361 | 2/1994 | McKillip. | |
| 5,289,079 | 2/1994 | Wittmann. | |
| 5,463,270 | 10/1995 | Wakimizu et al. | |
| 5,506,474 | 4/1996 | Hammer et al. | 313/490 X |
| 5,541,477 | 7/1996 | Maya et al. | |

*Primary Examiner*—Sandra L. O'Shea
*Assistant Examiner*—Mack Haynes
*Attorney, Agent, or Firm*—George E. Hawranko

[57] ABSTRACT

The invention relates to a single-ended discharge lamp having a lamp envelope comprising at least two tube legs, and a housing portion designed for mechanical and electrical connection to a lamp socket, which housing portion consists of a tube supporting part, a connection part and a screw base, which parts are linked together. Holes are made in the tube supporting part into which holes the legs of the lamp envelope are placed and the ends of the legs of the lamp envelope being inside the housing portion are fixed with a bonding material applied to the outside lamp envelope portion of the tube supporting part which portion surrounds the lamp envelope.

The essential feature of the invention is that the ends of the tube legs of the lamp envelope being inside the housing portion are fixed to the tube supporting part with a bonding material being also applied to the inside portion of the tube support part, which inside portion is bordered by the tube legs.

4 Claims, 1 Drawing Sheet

ASSEMBLY ARRANGEMENT FOR A COMPACT FLUORESCENT LAMP

FIELD OF THE INVENTION

The invention relates to a compact fluorescent lamp having a lamp envelope comprising at least two tube legs, and a housing portion designed for mechanical and electrical connection to a lampholder. More particularly, this invention relates to such a lamp wherein the legs of the lamp envelope are disposed in the housing by means of a bonding material applied to the outside and inside region of the housing cap which surrounds the lamp envelope.

BACKGROUND OF THE INVENTION

Single-ended discharge lamps have been described primarily as compact fluorescent lamps which are commercially available and have a lamp envelope comprising four or six glass tube legs. The ends of the legs of the lamp envelope are typically located inside the cap part of the housing and are fixed to the tube supporting part with a thermosetting cement material surrounding the lamp envelope. The cement material is in general bordered from outside by the outer rim of the tube supporting part. During manufacturing the cement material is, after being applied, set by heating and being maintained at a given temperature for a certain time. During this time the cement material swells and sets and is bonded by adhesion to the glass tube legs by an adhesion force exerted from the outer rim of the tube supporting part, due to which the tube legs remain fixed in the tube supporting part. With these discharge lamps it often causes problems that the tube legs sometimes crack or break spontaneously. The spontaneous break or crack can, based on the experience, occur not only during manufacturing, but later, e.g., during storage, transporting or in case when the discharge lamp is exposed to increased mechanical load as well, a fact impairing the reliability of the discharge lamp. It has been found that such damage occurs from the adhesion force of the bonding material being exerted from the tube supporting part to the legs of the lamp envelope.

SUMMARY OF THE INVENTION

The objective of the invention was to provide a solution eliminating the possibility of discharge lamp defect described previously, thereby enabling increased reliability of discharge lamps.

The invention is based on the recognition that mechanical forces are exerted to the glass by swelling and setting of the cement material which further increases the stresses generated in the glass in earlier stages of manufacturing. The stresses produced in this way can be reduced by fixing the ends of tube legs of the discharge tube being inside the cap part to the tube supporting part with a bonding material applied not only to the outside portion of the tube supporting part which portion surrounds the discharge tube, but also applied to the inside portion of the discharge tube bordered by the tube legs.

In accordance with this, the invention relates to a compact fluorescent lamp having a lamp envelope comprising at least two tube legs, and a housing portion designed for mechanical and electrical connection to a lampholder, which housing portion consists of a tube supporting part, a connection part and a threaded screw base, which parts are linked together. Holes are made in the tube supporting part into which the legs of the lamp envelope are placed and the ends of the legs of the lamp envelope being inside the housing portion are fixed with a bonding material applied to the outside portion of the tube supporting part which portion surrounds the lamp envelope. Furthermore, the ends of the legs of the lamp envelope being inside the housing portion are fixed to the tube supporting part with a bonding material also applied to the inside portion of the lamp envelope bordered by the tube legs.

In a preferred embodiment of the solution according to the invention on the tube supporting part, on the inside portion between the holes formed in the tube supporting part, a rib protruding towards the inside of the housing portion and supporting the bonding material is formed. Thereby, both this rib and the outer rim of the tube supporting part can, with proper dimensioning, provide for the space or surface suitable to accept and support the bonding material and ensure that the force generated by swelling and setting of the bonding material is taken up.

In order to compensate for the stress force exerted by the bonding material more uniformly, it is advantageous, particularly in the case of discharge lamps having a greater number of at least six tube legs, to use a rib with a shape of a cylinder mantle.

Using the solution according to the invention the glass tube legs are not exposed to asymmetrical load, due to which they will keep less mechanical stress. In addition, the solution according to the invention is advantageous as regards the fixing strength of the tube supporting part of the cap part and of the tube legs of the lamp envelope, i.e., this kind of bond withstands higher mechanical loads. The advantageous effect of the solution according to the invention manifests itself to a more significant extent particularly in case of lamp envelopes with a greater number of, the legs e.g., six, eight, etc..

BRIEF DESCRIPTION OF THE DRAWINGS

In the following, the invention will be described in more detail by means of an example of embodiment illustrated by drawing figures.

DETAILED DESCRIPTION OF THE INVENTION

Figure 1:
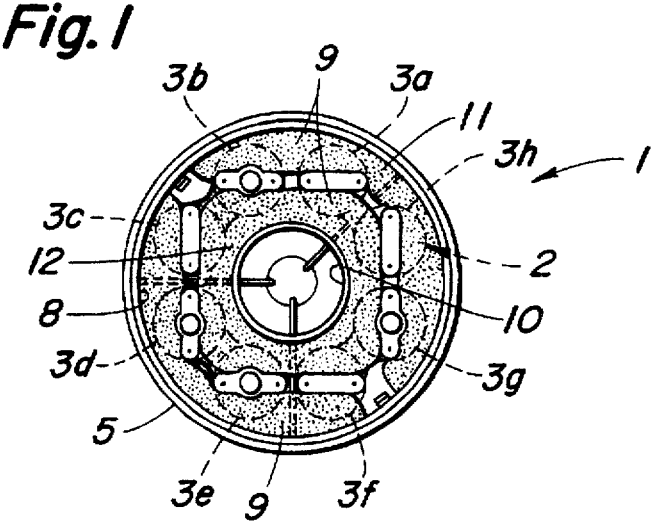
FIG. 1 is a sectional view of an embodiment of the discharge lamp according to the invention.
Figure 2:
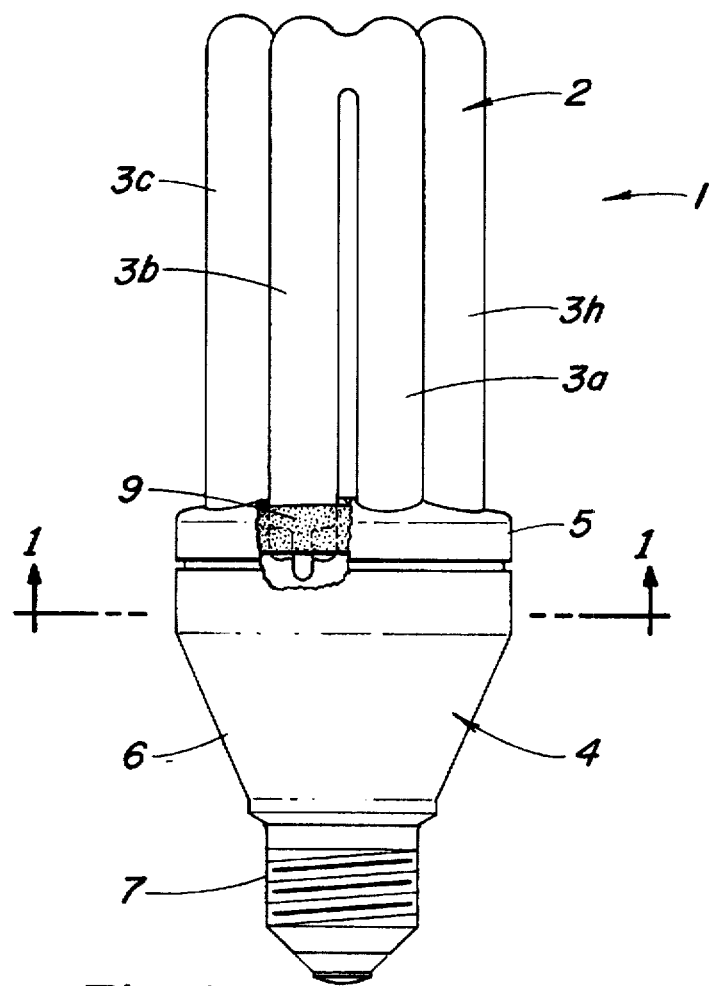
FIG. 2 is a front view of an embodiment of the discharge lamp according to the invention.

The discharge lamp according to FIGS. 1 and 2 is an OCT type compact fluorescent 1 lamp having a lamp envelope 2 and housing portion 4. Lamp envelope 2 has electrodes (not shown) and a gas and metal vapor fill, and also has eight tube legs 3a, 3b, 3c, 3d, 3e, 3f, 3g, 3h which have 12 mm outside diameter and of which the adjacent ones are contiguous with each other and make a closed, continuous discharge space. Housing portion 4 consists of a tube supporting part 5, a connection part 6 and a conventional threaded screw base or Edison base 7. On tube supporting part 5, circular openings are formed, the centers of which are placed on a circle of division with 37 mm diameter and which accept the tube legs 3a, 3b, 3c, 3d, 3e, 3f, 3g, 3h of the lamp envelope 2. In addition, on tube supporting part 5, a rib 10 is formed which protrudes towards the inside of housing portion 4. The rib 10 has the shape of a cylinder mantle, is in its material contiguous with tube supporting part 5 and has a thickness of 1 mm, a height of 6.5 mm, and an inside diameter of 20 mm. Tube supporting part 5 and connection part 6 are made from a plastic material, e.g., polybutylene terephtalate, and are fixed to each other by snapping them together, or adhesive sticking if needed. Edison base 7 is fixed on connection part 6, which Edison base 7 has e.g., a screw construction for being inserted into a conventional socket. An electronic circuitry operating the lamp envelope 2 and being connected with the electrodes of lamp envelope 2 on one part and with the contacts of Edison base 7 on the other, can be placed in connection part 6.

The ends of the tube legs 3a, 3b, 3c, 3d, 3e, 3f, 3g, 3h of the lamp envelope 2 being inside the housing portion 4 are fixed to tube supporting part 5 with a bonding material 9 (denoted by stibling in the Figures) that is applied to two places, to outside portion 11 surrounding the lamp envelope 2 and bordered from outside by a cylinder mantle shaped rim 8 with 53.5 mm outside diameter and 2 mm wall thickness, and to inside portion 12 bordered by tube legs 3a, 3b, 3c, 3d, 3e, 3f, 3g, 3h, but to outside of the rim 10.

Bonding material 9 is a thermosetting cement composed of natural and artificial resins and a solvent prior to application. After application the cement is heated to set or burned in for a few minutes at temperatures between 100 and 180° C. It is preferable to apply the cement to outside portion 11 and inside portion 12 in a quantity to cover the parts listed in the previous paragraph in a way shown in the Figures also, except for the portions of about 1 to 3 mm width being between the adjacent tube legs. Bonding material 9 follows the shape of the ends of tube legs, so it continues to extend from two sides on the pinched portions of the ends of tube legs. Having burned in, bonding material 9 reaches heights of 7 to 8 mm inside and 8 to 9 mm outside, relative to the surface of tube supporting part 5.

Between tube supporting part 5 and lamp envelope 2, the discharge lamp described in the example is, in the average, able to withstand 5 Nm torsion moment without damage, while in case of OCT discharge lamp of the same size, in which discharge lamp the bonding material 9 is applied to outside portion 11 only, this value is approximately 2.5 Nm.

The discharge lamp according to the invention can be constructed in several ways in accordance with the scope of protection; therefore the invention is not intended to be limited to any of the features mentioned in the example described.

What is claimed is:

1. A single-ended discharge lamp comprising:

a lamp envelope having at least two tube legs having inner surfaces that face one another and outside surfaces;

a housing providing mechanical and electrical connection to the lamp envelope;

a tube supporting part of the housing including an outer member and an upper surface having at least two holes into which the tube legs are received;

a rib extending from the upper surface of the tube supporting part in a center portion of the tube supporting part between the holes; and a bonding material applied between the rib and inside surfaces of the tube legs, and between the outer member and outside surfaces of the tube legs for securing the lamp envelope in place.

2. A discharge lamp according to claim 1, wherein the outer member of the tube supporting part is substantially cylindrical.

3. A discharge lamp according to claim 1, wherein the rib is a cylindrical shaped mantle.

4. A single-ended discharge lamp comprising:

a lamp envelope having at least two tube legs;

a housing providing mechanical and electrical connection to the lamp envelope;

a tube supporting part of the housing including at least two holes into which the tube legs are received, the tube receiving part including an outer cylindrical portion which defines one side of the outer area, and the tube supporting part includes an inner mantle which defines one side of the inner area;

an outer area of the tube supporting part located between an exterior surface of the tube supporting part and the tube legs;

an inner area of the tube supporting part located between the tube legs and a center of the supporting part; and a bonding material applied in both the outer area and the inner area to secure the lamp envelope in place in the tube supporting part.

* * * * *